United States Patent
Jnawali et al.

(10) Patent No.: US 12,524,999 B2
(45) Date of Patent: Jan. 13, 2026

(54) GENERATING IMAGES WITH SMALL OBJECTS FOR TRAINING A PRUNED SUPER-RESOLUTION NETWORK

(71) Applicant: Samsung Electronics Co., Ltd., Suwon-si (KR)

(72) Inventors: Kamal Jnawali, Tustin, CA (US); Tien Cheng Bau, Irvine, CA (US); Joonsoo Kim, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 18/242,965

(22) Filed: Sep. 6, 2023

(65) Prior Publication Data
US 2024/0119706 A1    Apr. 11, 2024

Related U.S. Application Data

(60) Provisional application No. 63/412,282, filed on Sep. 30, 2022.

(51) Int. Cl.
*G06K 9/00* (2022.01)
*G06T 3/4046* (2024.01)
(Continued)

(52) U.S. Cl.
CPC .......... *G06V 10/774* (2022.01); *G06T 3/4046* (2013.01); *G06T 3/4053* (2013.01);
(Continued)

(58) Field of Classification Search
CPC .......... G06V 10/774; G06V 30/19147; G06V 20/46; G06V 10/82; G06V 20/62;
(Continued)

(56) References Cited

U.S. PATENT DOCUMENTS 10,007,863 B1    6/2018  Pereira et al.
10,467,729 B1*  11/2019  Perera .................. G06T 3/4046
(Continued)

FOREIGN PATENT DOCUMENTS

CN    112580381 A    3/2021
CN    115761681 A    3/2023
(Continued)

OTHER PUBLICATIONS

Carvalho, P. et al., "Automatic TV logo identification for advertisement detection without prior data." Applied Sciences, Aug. 15, 2021, pp. 17, v. 11, n. 16, United States.

(Continued)

*Primary Examiner* — Gregory A Morse
*Assistant Examiner* — Kevin M Coomber
(74) *Attorney, Agent, or Firm* — Sherman IP LLP; Kenneth L. Sherman; Steven Laut

(57) ABSTRACT

One embodiment provides a method comprising detecting at least one object displayed within at least one input frame of an input video. The method further comprises cropping, from the at least one input frame, at least one cropped image including the at least one object. The method further comprises generating at least one training image by overlaying simulated text on the at least one cropped image. The method further comprises providing the at least one training image to a pruned convolutional neural network (CNN). The pruned CNN learns, from the at least one training image, to reconstruct objects and textual regions during image super-resolution.

20 Claims, 16 Drawing Sheets

(51) Int. Cl.
*G06T 3/4053* (2024.01)
*G06T 7/13* (2017.01)
*G06T 7/73* (2017.01)
*G06V 10/26* (2022.01)
*G06V 10/774* (2022.01)
*G06V 10/82* (2022.01)
*G06V 20/40* (2022.01)
*G06V 20/62* (2022.01)

(52) U.S. Cl.
CPC .................. *G06T 7/13* (2017.01); *G06T 7/73* (2017.01); *G06V 10/26* (2022.01); *G06V 10/82* (2022.01); *G06V 20/46* (2022.01); *G06V 20/62* (2022.01); *G06T 2207/10016* (2013.01); *G06T 2207/20076* (2013.01); *G06T 2207/20081* (2013.01); *G06T 2207/20084* (2013.01); *G06T 2207/20132* (2013.01); *G06V 2201/09* (2022.01)

(58) Field of Classification Search
CPC ................ G06V 2201/09; G06V 10/26; G06T 2207/20081; G06T 7/13; G06T 7/73; G06T 3/4046; G06T 2207/20076; G06T 2207/20084; G06T 2207/10016; G06T 2207/20132; G06T 15/30; G06T 3/4053; G06T 5/73; G06T 3/4076
See application file for complete search history.

(56) References Cited

U.S. PATENT DOCUMENTS

| | | |
|---|---|---|
| 10,970,645 B1 | 4/2021 | Kim et al. |
| 11,170,567 B2 | 11/2021 | Omari et al. |
| 11,182,649 B2 | 11/2021 | Tremblay et al. |
| 11,188,777 B2 | 11/2021 | Hiasa |
| 11,200,495 B2* | 12/2021 | Wang ............... G06N 3/045 |
| 11,281,943 B2 | 3/2022 | Wang et al. |
| 11,693,921 B2* | 7/2023 | Ge .................. G06V 10/945 382/159 |
| 2020/0195904 A1 | 6/2020 | Tauber |
| 2020/0242771 A1* | 7/2020 | Park .................. G06T 7/11 |
| 2021/0264260 A1* | 8/2021 | Kim .................. G06N 3/04 |
| 2022/0130013 A1 | 4/2022 | Pottorff et al. |

FOREIGN PATENT DOCUMENTS

| | | |
|---|---|---|
| WO | 2021-225296 A1 | 11/2021 |
| WO | 2022-037642 A1 | 2/2022 |
| WO | 2022-054069 A1 | 3/2022 |
| WO | 2022/179492 A1 | 9/2022 |

OTHER PUBLICATIONS

Özay, N. et al., "Automatic TV logo detection and classification in broadcast videos." 17th European Signal Processing Conference, Aug. 24, 2009, pp. 839-843, IEEE, United States.

Xiao, G., et al., "Supervised TV logo detection based on SVMS." 2nd IEEE International Conference on Network Infrastructure and Digital Content, Sep. 24, 2010, pp. 174-178, IEEE, United States.

Hou, Z., et al., Efficient Image Super Resolution Via Channel Discriminative Deep Neural Network Pruning, 2020 IEEE International Conference on Acoustics, Speech and Signal Processing (ICASSP), May 4, 2020, pp. 3647-3651, London, UK.

International Search Report and Written Opinion dated Jan. 9, 2024 for International Application PCT/KR2023/014871, from Korean Intellectual Property Office, pp. 1-10, Republic of Korea.

Extended European search report dated Sep. 1, 2025 for European Application 23873133.5, from European Patent Office, pp. 1-6 Munich, Germany.

Peyrard, C., "Single Image Super-Resolution based on Neural Networks for text and face recognition", PhD diss., Uiversité de Lyon, 2017, pp. 1-188, HAL open science, France.

Jain, D., "On-device Text Image Super Resolution", 25th International conference on Pattern Recognition, Jan. 2021, pp. 5775-5781, IEEE, Milan Italy.

Hou, Z., et al., "Efficient Image Super Resolution via Channel Discriminative Deep Neural Network Pruning," In ICASSP 2020-2020 IEEE International Conference on Acoustics, Speech and Signal Processing (ICASSP), May 4, 2020, pp. 3647-3651, IEEE, United States.

* cited by examiner

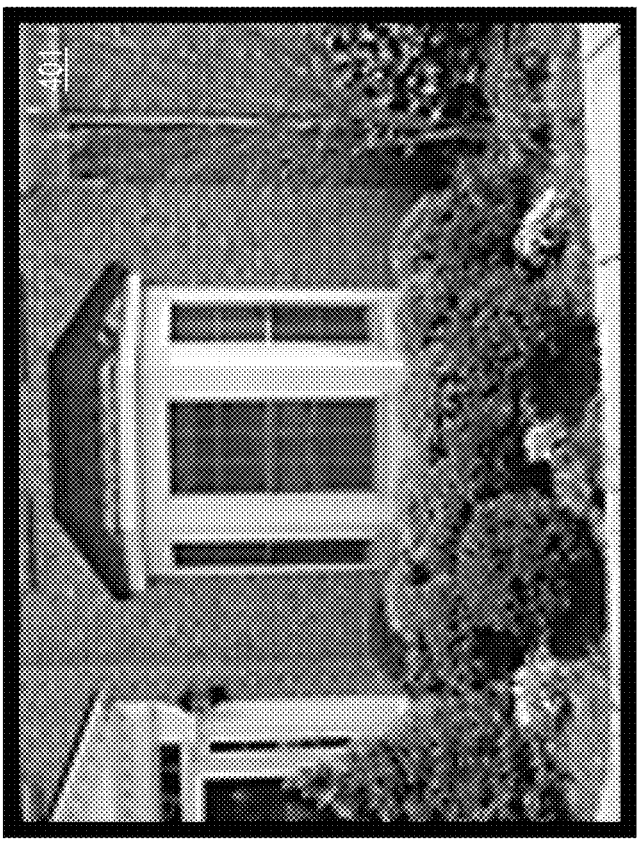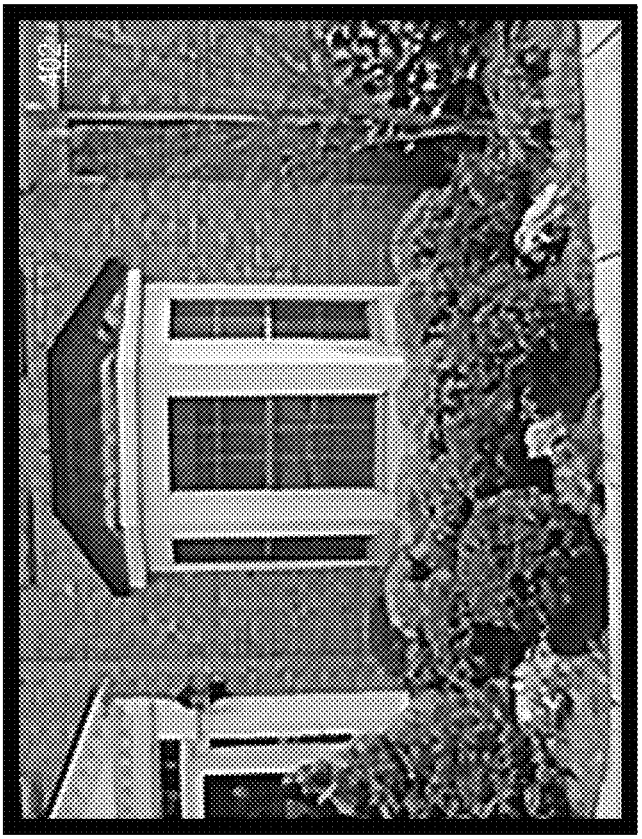
FIG. 10

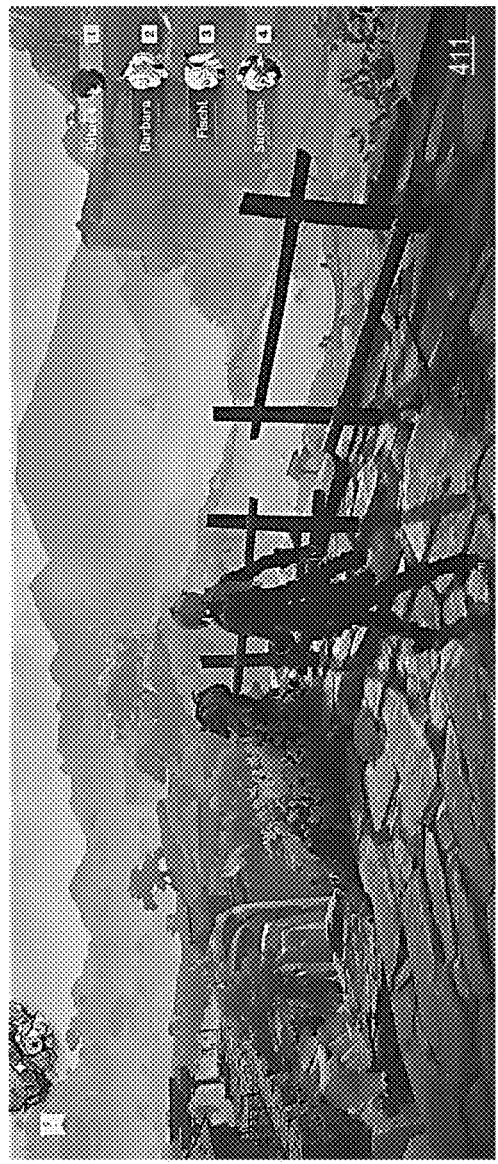
FIG. 11A

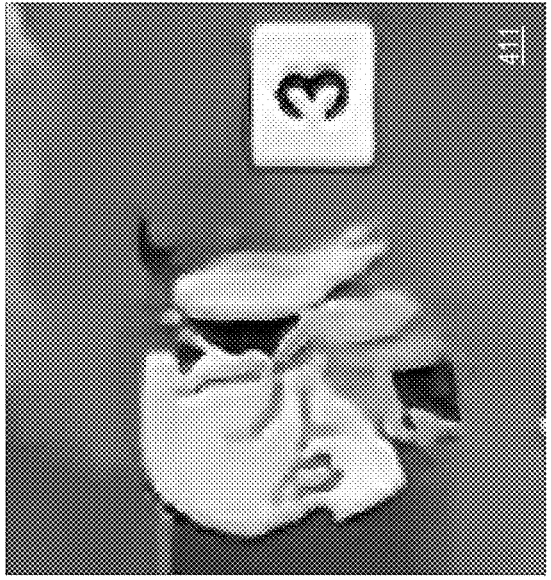
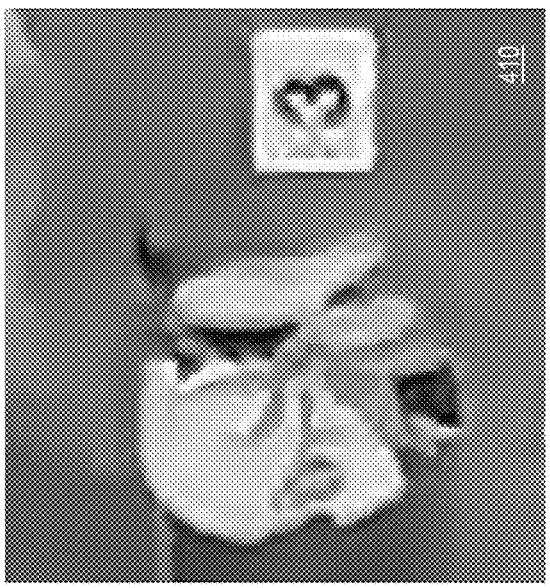
FIG. 11B

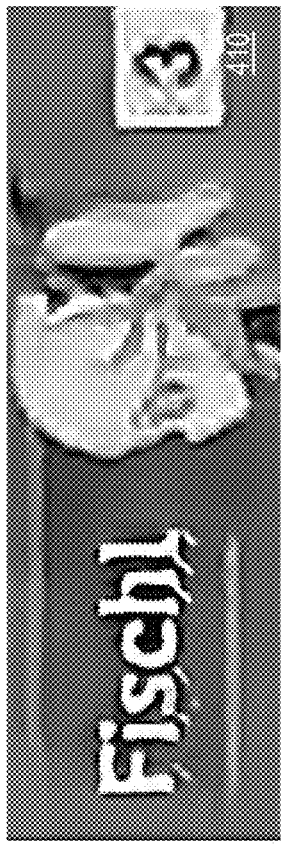
FIG. 11D

GENERATING IMAGES WITH SMALL OBJECTS FOR TRAINING A PRUNED SUPER-RESOLUTION NETWORK

CROSS-REFERENCE TO RELATED APPLICATIONS

The present application claims priority to U.S. Provisional Patent Application No. 63/412,282, filed on Sep. 30, 2022, incorporated by reference in its entirety.

TECHNICAL FIELD

One or more embodiments generally relate to image super-resolution (SR), in particular, a method and system for generating images with small objects for training a pruned SR network.

BACKGROUND

Image super-resolution (SR) is the process of recovering high-resolution (HR) images from low-resolution (LR) images.

SUMMARY

One embodiment provides a method comprising detecting at least one object displayed within at least one input frame of an input video. The method further comprises cropping, from the at least one input frame, at least one cropped image including the at least one object. The method further comprises generating at least one training image by overlaying simulated text on the at least one cropped image. The method further comprises providing the at least one training image to a pruned convolutional neural network (CNN). The pruned CNN learns, from the at least one training image, to reconstruct objects and textual regions during image super-resolution.

Another embodiment provides a system comprising at least one processor and a non-transitory processor-readable memory device storing instructions that when executed by the at least one processor causes the at least one processor to perform operations. The operations include detecting at least one object displayed within at least one input frame of an input video. The operations further include cropping, from the at least one input frame, at least one cropped image including the at least one object. The operations further include generating at least one training image by overlaying simulated text on the at least one cropped image. The operations further include providing the at least one training image to a pruned CNN. The pruned CNN learns, from the at least one training image, to reconstruct objects and textual regions during image super-resolution.

One embodiment provides a non-transitory processor-readable medium that includes a program that when executed by a processor performs a method. The method comprises detecting at least one object displayed within at least one input frame of an input video. The method further comprises cropping, from the at least one input frame, at least one cropped image including the at least one object. The method further comprises generating at least one training image by overlaying simulated text on the at least one cropped image. The method further comprises providing the at least one training image to a pruned CNN. The pruned CNN learns, from the at least one training image, to reconstruct objects and textual regions during image super-resolution.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 10 illustrates an example of visual differences between a LR image and a HR image reconstructed from the LR image using a pruned SR network trained using training images with added or overlayed text, in one or more embodiments;

FIG. 11A illustrates an example of visual differences between a HR image reconstructed by a conventional pruned SR network and a HR image reconstructed by a pruned SR network trained using training images with added or overlayed text, in one or more embodiments;

FIG. 11B illustrates a first set of close-up views of the HR images in FIG. 11A, in one or more embodiments;

FIG. 11D illustrates a third set of close-up views of the HR images in FIG. 11A, in one or more embodiments;

DETAILED DESCRIPTION

Figure 1:
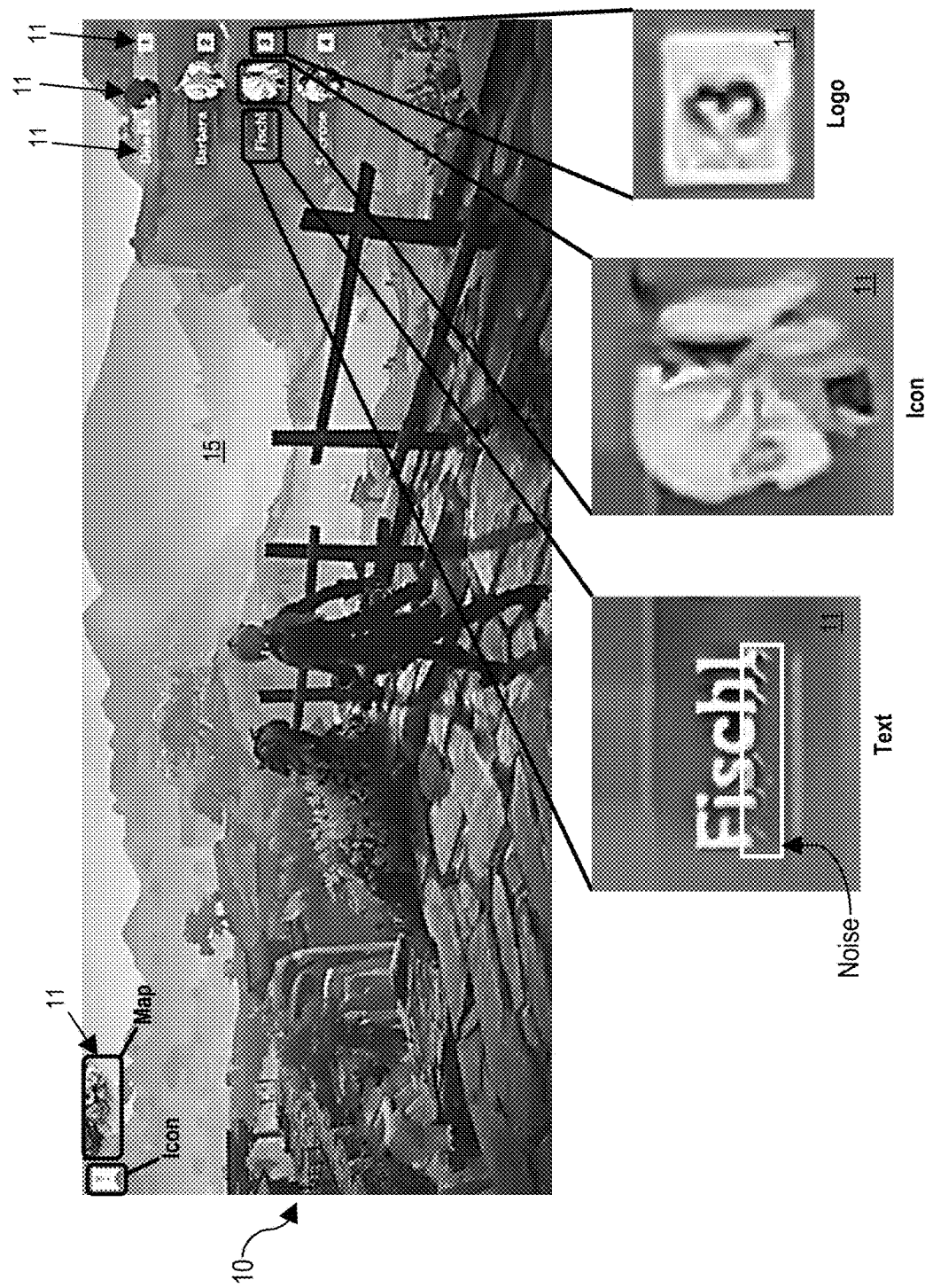
FIG. 1 illustrates an example of high-resolution (HR) image reconstructed from a low-resolution (LR) image using a conventional pruned super-resolution (SR) network.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to image super-resolution (SR), in particular, a method and system for generating images with small objects for training a pruned SR network. One embodiment provides a method comprising detecting at least one object displayed within at least one input frame of an input video. The method further comprises cropping, from the at least one input frame, at least one cropped image including the at least one object. The method further comprises generating at least one training image by overlaying simulated text on the at least one cropped image. The method further comprises providing the at least one training image to a pruned convolutional neural network (CNN). The pruned CNN learns, from the at least one training image, to reconstruct objects and textual regions during image super-resolution.

Another embodiment provides a system comprising at least one processor and a non-transitory processor-readable memory device storing instructions that when executed by the at least one processor causes the at least one processor to perform operations. The operations include detecting at least one object displayed within at least one input frame of an input video. The operations further include cropping, from the at least one input frame, at least one cropped image including the at least one object. The operations further include generating at least one training image by overlaying simulated text on the at least one cropped image. The operations further include providing the at least one training image to a pruned CNN. The pruned CNN learns, from the at least one training image, to reconstruct objects and textual regions during image super-resolution.

One embodiment provides a non-transitory processor-readable medium that includes a program that when executed by a processor performs a method. The method comprises detecting at least one object displayed within at least one input frame of an input video. The method further comprises cropping, from the at least one input frame, at least one cropped image including the at least one object. The method further comprises generating at least one training image by overlaying simulated text on the at least one cropped image. The method further comprises providing the at least one training image to a pruned CNN. The pruned CNN learns, from the at least one training image, to reconstruct objects and textual regions during image super-resolution.

Conventional deep learning-based single image SR networks, such as CNNs, are ubiquitous in the SR field. As these networks contain a large number of parameters, these networks are capable of learning complex features ranging from low-level features (e.g., edges and corners) to high-level features (e.g., global features). These networks, however, require large amounts of memory to store on consumer electronic devices (e.g., television hardware) which in turn becomes a bottleneck in hardware implementation. To design a hardware-friendly SR network, the network must be pruned to contain fewer parameters. However, a resulting pruned SR network significantly loses capacity to learn complex features ranging from low-level features to high-level features.

The performance of a deep neural network depends on type of training samples included in training data used to train the network. The better the training samples included in the training, the higher the performance of the network. For example, if a real-word image contains a small object that occupies less than five percent (5%) of an area/region of the image (e.g., a small object such as a logo, text, a number, an icon, or a map), and the image is part of a training pair used to train a pruned SR network, the probability of the resulting pruned SR network learning or seeing the small object is very low because of the size of the small object relative to the entire area/region of the image. Instead, the pruned SR network only learns to reconstruct a background and non-textual areas/regions of the image, and fails to learn features corresponding to small objects (including textual areas/regions) of the same image. Therefore, if a low-resolution (LR) image contains one or more small objects, the pruned SR network is not able to reconstruct a realistic high-resolution (HR) image without noise from the LR image.

One or more embodiments provide a framework for improving performance of a pruned SR network using an optimal and well-curated training dataset. The framework provides, as the training dataset, training samples encompassing a full set of features ranging from a big object to a small object and from a non-textual area/region to a textual area/region. In one embodiment, one or more small objects of interest—such as icons, maps, logos, numbers, and/or text—are extracted from real-world images to generate training images that are then used as training pairs to train the pruned SR network. With these training pairs, the pruned SR network learns background and non-textual areas/regions of images as well as small objects (including textual areas/regions) of the same images, thereby enabling the pruned SR network to reconstruct a realistic HR image without noise from a corresponding LR image.

In one embodiment, small objects of interest are extracted from real-world images using static detection.

In one embodiment, small objects of interest are extracted from real-world images using a deep-learning based You Only Look Once (YOLO) object detection algorithm.

In one embodiment, random text—such as words, sentences, and paragraphs—are overlayed on one or more training images to improve the capacity of the pruned SR network to reconstruct realistic HR images without noise from LR images.

FIG. 1 illustrates an example of HR image 10 reconstructed from a LR image using a conventional pruned SR network. As shown in FIG. 1, the HR image 10 includes a background 15 and a plurality of small objects 11, such as icons, logos, text, and a map. Each small object 11 occupies less than five percent (5%) of an area/region of the HR image 10. As shown in FIG. 1, the conventional pruned SR network reconstructed the background 15 with high probability, but failed to reconstruct the small objects 11 realistically without noise. Compared to the background 15, the small objects 11 displayed within the HR image 10 are blurry and/or have other visual artifacts, and may have a lower degree of color clarity and contrast.

Figure 2:
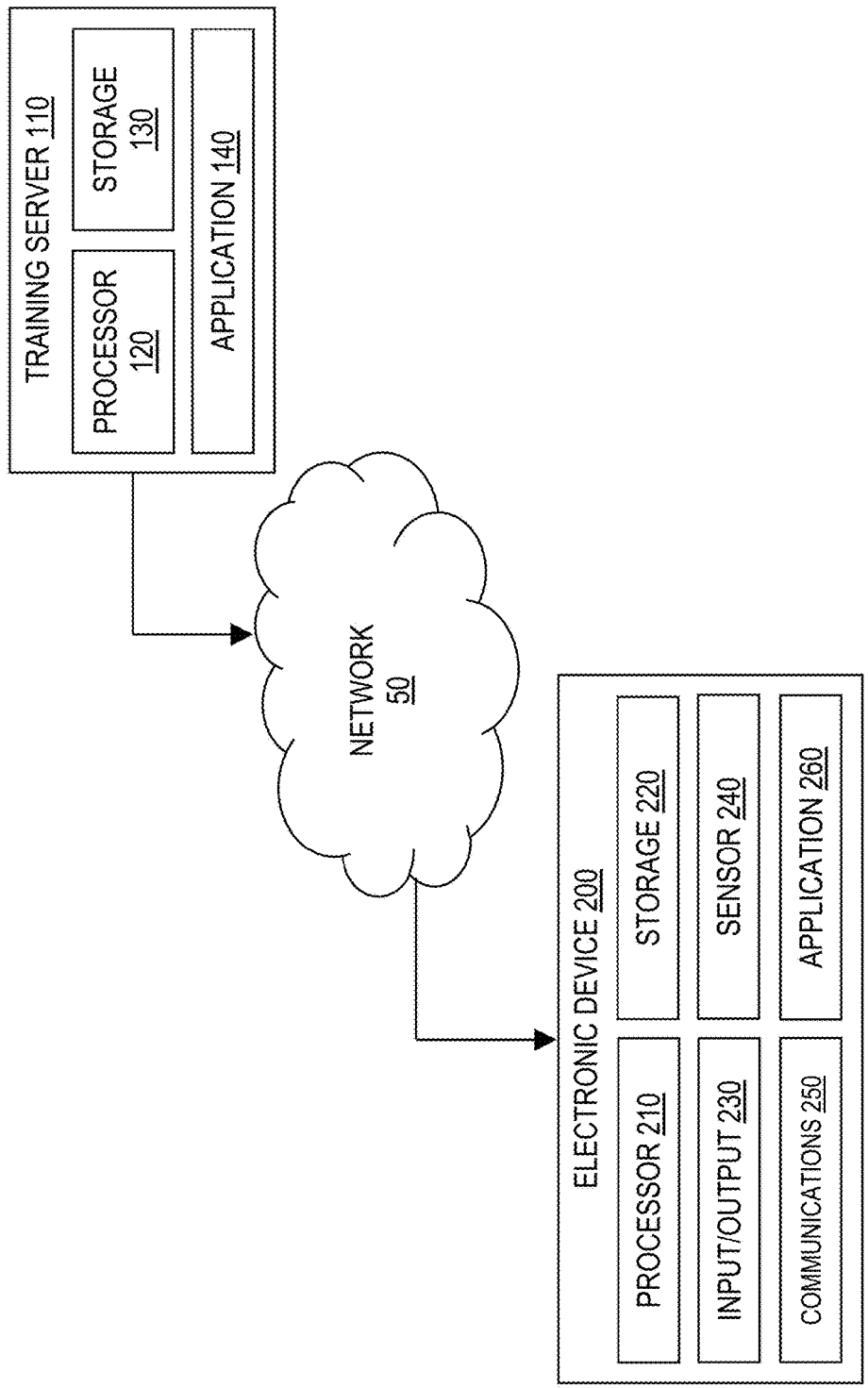
FIG. 2 illustrates an example computing architecture for generating training data for training a pruned SR network to learn features corresponding to small objects, in one or more embodiments.

FIG. 2 illustrates an example computing architecture 100 for generating training data for training a pruned SR network to learn features corresponding to small objects, in one or more embodiments. The computing architecture 100 comprises at least one training server 110 including resources, such as one or more processor units 120 and one or more storage units 130. One or more applications 140 may execute/operate on the training server 110 utilizing the resources of the training server 110.

In one embodiment, the one or more applications 140 executing/operating on the training server 110 are configured to perform off-device (i.e., offline) training. In one embodiment, the off-device training comprises: (1) generating training data comprising paired LR and HR training samples (i.e., training pairs), and (2) training a pruned SR network based on the training data. As described in detail later herein, the pruned SR network is trained to learn features corresponding to a background and non-textual areas/regions of images, as well as features corresponding to small objects (including textual areas/regions) of the same images. The resulting trained pruned SR network may be deployed for use in noise-reduced and/or artifact-reduced reconstruction of HR images from LR images, wherein the LR images include one or more small objects.

In one embodiment, the computing architecture 100 comprises at least one electronic device 200 including resources, such as one or more processor units 210 and one or more storage units 220. One or more applications 260 may execute/operate on the electronic device 200 utilizing the resources of the electronic device 200. In one embodiment, the one or more applications 260 may include one or more software mobile applications loaded onto or downloaded to the electronic device 200, such as a camera application, a social media application, a video streaming application, etc.

Examples of an electronic device 200 include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IoT) device, a cable box, a satellite receiver, etc.

In one embodiment, an electronic device 200 comprises one or more input/output (I/O) units 230 integrated in or coupled to the electronic device 200. In one embodiment, the one or more I/O units 230 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 230 to configure one or more parameters, provide user input, etc.

In one embodiment, an electronic device 200 comprises one or more sensor units 240 integrated in or coupled to the electronic device 200. In one embodiment, the one or more sensor units 240 include, but are not limited to, a RGB color sensor, an IR sensor, an illuminance sensor, a color temperature sensor, a camera, a microphone, a GPS, a motion sensor, etc.

In one embodiment, an electronic device 200 comprises a communications unit 250 configured to exchange data with at least one training server 110 over a communications network/connection 50 (e.g., a wireless connection such as a Wi-Fi connection or a cellular data connection, a wired connection, or a combination of the two). The communications unit 250 may comprise any suitable communications circuitry operative to connect to a communications network and to exchange communications operations and media between the electronic device 200 and other devices connected to the same communications network 50. The communications unit 250 may be operative to interface with a communications network using any suitable communications protocol such as, for example, Wi-Fi (e.g., an IEEE 802.11 protocol), Bluetooth high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, a trained pruned SR network (e.g., from a training server 110) is loaded on or downloaded to an electronic device 200, such that the pruned SR network can perform on-device (i.e., on the electronic device 200) noise-reduced and/or artifact-reduced reconstruction of HR images from LR images.

Figure 3:
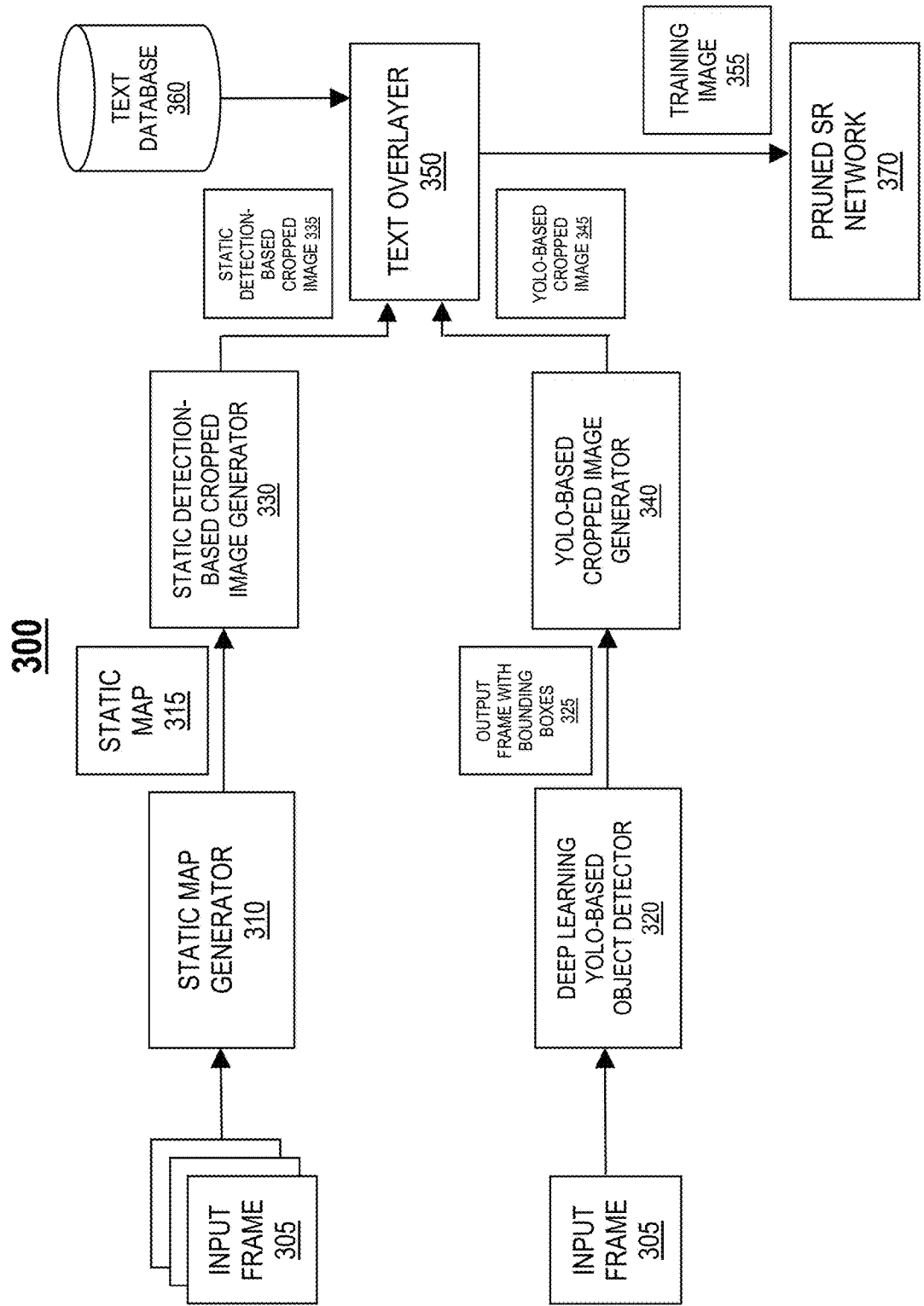
FIG. 3 illustrates an example training system for generating training data for training a pruned SR network to learn features corresponding to small objects, in one or more embodiments.

FIG. 3 illustrates an example training system 300 for generating training data for training a pruned SR network to learn features corresponding to small objects, in one or more embodiments. In one embodiment, one or more applications 140 (FIG. 2) executing/operating on a training server 110 (FIG. 2) include the training system 300.

In one embodiment, the training system 300 comprises a static map generator 310 configured to: (1) receive, as input, a sequence of n input frames 305, (2) generate, using static detection, a probabilistic static map 315 based on the n input frames 305, and (3) provide, as output, the probabilistic static map 315. The probabilistic static map 315 is noise-free and contains only static small objects displayed within the n input frames 305. Examples of small objects include, but are not limited to, icons, text, numbers, maps, logos, etc. For example, in one embodiment, the n input frames 305 represent a history of n image/video frames of an input video, wherein the n image/video frames are previous image/video frames preceding a current image/video frame of the input video. In one embodiment, the n input frames 305 are received from a remote server hosting one or more online services (e.g., a video streaming service, a gaming streaming service, etc.). As described in detail later herein, to improve detection of static small objects displayed within n input frames 305, the static map generator 310 implements static detection using edge detection.

Static detection may fail to detect small objects that are displayed in an input video for a brief period of time only (e.g., in less than twenty (20) input frames 305 of the input video). By comparison, YOLO is an algorithm in object detection that only looks once at an image to predict what objects are displayed within the image and where the objects are.

In one embodiment, the training system 300 comprises a deep learning YOLO-based object detector 320 configured to: (1) receive, as input, only one input frame 305, and (2) detect and localize, using a YOLO-based object detection algorithm, one or more small objects displayed within the input frame 305, and (3) provide, as output, an output frame 325 comprising the one or more small objects and its one or more bounding boxes (BB). As described in detail later herein, in one embodiment, the YOLO-based object detection algorithm comprises a trained deep learning model.

The training system 300 implements static detection (via the static map generator 310), as well as YOLO-based object detection (via the YOLO-based object detector 320) to detect small objects that are displayed in an input video for a brief period of time only (e.g., in less than twenty (20) input frames 305 of the input video).

In one embodiment, the training system 300 comprises a static detection-based cropped image generator 330 configured to: (1) receive, as input, a probabilistic static map 315 comprising one or more detected static small objects (e.g., from the static map generator 310), (2) obtain a center of each detected static small object based on the probabilistic static map 315, (3) generate a list comprising each pixel-location of each center of each detected static small object, (4) randomly sample a high probability pixel-location from the list (i.e., high probability area/region of the probabilistic static map 315), and (5) generate a static detection-based cropped image 335 of size m×n comprising at least one of the detected static small objects, wherein the randomly sampled high probability pixel-location is used as a center of the static detection-based cropped image 335. The static detection-based cropped image generator 330 extracts features for at least one of the detected static small objects, and provides the static detection-based cropped image 335 comprising the extracted features.

In one embodiment, the training system 300 comprises a YOLO-based cropped image generator 340 configured to: (1) receive, as input, an output frame 325 comprising one or more detected small objects and its one or more bounding boxes (e.g., from the deep learning YOLO-based object detector 320), (2) generate a list comprising each bounding box corresponding to each detected small object, (3) randomly select a bounding box from the list, and (4) generate a YOLO-based cropped image 345 of size m×n comprising at least one of the detected small objects, wherein the randomly selected bounding box corresponds to a detected small object included in the YOLO-based cropped image 345. The YOLO-based cropped image generator 340 extracts features for at least one of the detected small objects, and provides the YOLO-based cropped image 345 comprising the extracted features.

In one embodiment, the static detection-based cropped image generator 330 and the YOLO-based cropped image generator 340 are implemented as separate components of the training system 300. In another embodiment, the static detection-based cropped image generator 330 and the YOLO-based cropped image generator 340 are implemented as one component of the training system 300.

Real-world images may contain multiple textual information such as author information, date and time of image generation or production, subtitles, number of frames, etc. Conventional pruned SR networks, however, are trained with images that do not contain such textual information, resulting in trained pruned SR networks that fail to reconstruct HR images with features for text from LR images.

In one embodiment, the training system 300 comprises a text overlayer 350 configured to: (1) receive a cropped image 335 or 345 (e.g., from the static detection-based cropped image generator 330 or the YOLO-based cropped image generator 340), (2) generate simulated text using a text database 360 comprising characters, words, sentences, paragraphs, names, and/or numbers, (3) add or overlay the simulated text on the cropped image 335 or 345, resulting in a training image 355, and (4) provide, as output, the training image 355. As described in detail later herein, the simulated text may comprise characters, words, sentences, paragraphs, names, and/or numbers.

The text overlayer 350 provides training images 355 with added or overlayed text for use as training data in training a pruned SR network to learn text and symbols with correct grammar, thereby increasing the probability of the pruned SR network realistically reconstructing HR images with characters, words, sentences, paragraphs, names, and/or numbers from LR images. For example, in one embodiment, the training server 110 comprises a pruned SR network 370 (e.g., a pruned CNN) that is trained based on training pairs comprising training images 355 (e.g., from the text overlayer 350). As another example, in one embodiment, training pairs comprising training images 355 (e.g., from the text overlayer 350) are provided to an electronic device 200 or a remote server for training a pruned SR network deployed on the electronic device 200 or the remote server.

Figure 4:
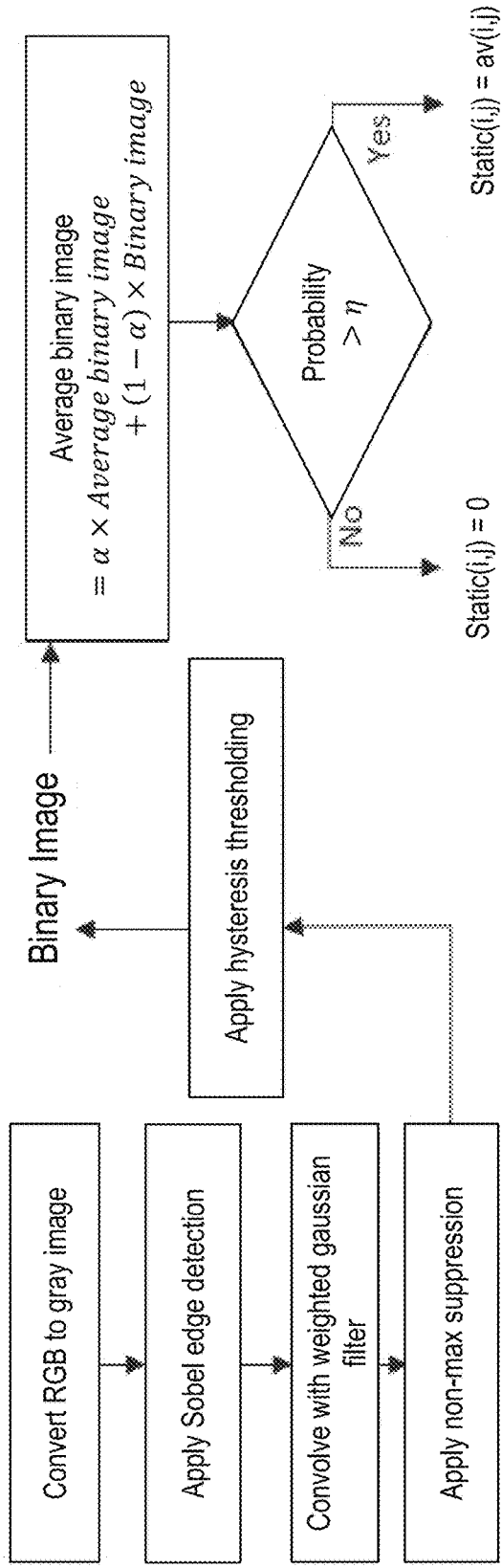
FIG. 4 illustrates an example workflow of a static map generator of the training system, in one or more embodiments.

FIG. 4 illustrates an example workflow of the static map generator 310 (FIG. 3), in one or more embodiments. For each input frame 305 (FIG. 3) the static map generator 310 receives, the static map generator 310 converts an RGB image of the input frame 305 to a grayscale image $I_{image}$.

Edge detection involves using one or more matrices to calculate one or more areas of different pixel intensities of an image. Areas where there are extreme differences in pixel intensities usually indicate an edge of an object. Sobel edge detection is a widely used edge detection algorithm in image processing.

The static map generator 310 next applies Sobel edge detection to the grayscale image $I_{image}$, resulting in an edge map (i.e., edge image) that focuses on one or more regions of interests (i.e., one or more small objects) by removing one or more flat areas. If a small object is displayed within one or more frames for a brief amount of time only, Sobel edge detection helps to detect such changes quickly.

Let $K_x$ and $K_y$ denote a x-direction kernel and a y-direction kernel, respectively. Each kernel $K_x$, $K_y$ is a 3×3 matrix comprising differently (or symmetrically) weighted indexes. In one embodiment, the kernels $K_x$ and $K_y$ are represented in accordance with equations (1)-(2) provided below:

$$K_x = \begin{matrix} -1 & 0 & 1 \\ -2 & 0 & 2 \\ -1 & 0 & 1 \end{matrix}, \text{ and} \qquad (1)$$

$$K_y = \begin{matrix} -1 & -2 & -1 \\ 0 & 0 & 0 \\ 1 & 2 & 1 \end{matrix}. \qquad (2)$$

As part of Sobel edge detection, the static map generator 310 uses kernel convolution. Specifically, the static map generator 310 processes the grayscale image $I_{image}$ in the x-direction by convolving the grayscale image $I_{image}$ with the x-direction kernel $K_x$, resulting in a first edge map showing edges of the grayscale image linage. The static map generator 310 separately processes the grayscale image $I_{image}$ in the y-direction by convolving the grayscale image $I_{image}$ with the y-direction kernel $K_y$, resulting in a second edge map showing edges of the grayscale image $I_{image}$. The static map generator 310 computes the square root of the sum of the square of the first edge map and the square of the second edge map to generate a gradient magnitude image $I_{gradient\ magnitude\ image}$, in accordance with equation (3) provided below:

$$I_{gradient\ magnitude\ image} = \sqrt{(I_{image}*K_x)^2 + (I_{image}*K_y)^2} \qquad (3),$$

wherein * denotes a convolutional operation, $I_{image}*K_x$ denotes the first edge map, and $I_{image}*K_y$ denotes the second edge map.

The static map generator 310 next generates a unit image having the same size as the grayscale image $I_{image}$, and applies a weighted gaussian filter to the unit image to generate a weighted gaussian image $I_{weighted\ gaussian}$ (i.e., convolves with the weighted gaussian filter). As most small objects are typically displayed on or about an edge (i.e., boundary) of an image, the weighted gaussian image $I_{weighted\ gaussian}$ gives more importance to edges (i.e., boundaries) and less importance to a center—the weighted gaussian image $I_{weighted\ gaussian}$ emphasizes edges (i.e., boundaries) of the unit image and de-emphasizes a center of the unit image. In one embodiment, the static map generator 310 generates the weighted gaussian image $I_{weighted\ gaussian}$ in accordance with equation (4) provided below:

$$I_{weighted\ gaussian} = \left(1 - \frac{1}{2\pi\sigma^2} \times \exp\left(-1 \times \frac{(x^2 + y^2)}{2\sigma^2}\right)\right), \quad (4)$$

wherein $\sigma = \frac{\text{height of the image}}{\gamma}$, and $\gamma = 4$.

The static map generator 310 convolves the weighted gaussian image $I_{weighted\ gaussian}$ with the gradient magnitude image $I_{gradient\ magnitude\ image}$ to generate a noise-free gradient magnitude image that reduces noise by minimizing effects of one or more non-static objects.

The static map generator 310 next applies non-max suppression—an edge-thinning method—to the noise-free gradient magnitude image, resulting in a non-max suppressed and noise-free gradient magnitude image. Non-max suppression involves determining, for each pixel of the image, whether the pixel is a local maximum in the vicinity of the gradient for the pixel. If the pixel is a local maximum, the pixel is maintained as an edge pixel; otherwise, the pixel is suppressed. Therefore, real edges in an image are more accurately represented by non-max suppression.

Some edges in an image may be brighter than other edges in the image, such that the image has brighter edges and lighter edges. Stronger edges may be seen in the brighter edges, although noise or edges may also be seen in the lighter edges. If a histogram of an image shows no obvious valleys, many background pixels of the image have the same grayscale level as object pixels of the image, and vice versa. In such cases, to determine whether a given edge corresponds to a real edge, the static map generator 310 next applies hysteresis thresholding to the non-max suppressed and noise-free gradient magnitude image, resulting in a noise-free binary image (i.e., detection map).

Let $High(\theta_2)$ and $Low(\theta_1)$ denote two different thresholds the static map generator 310 uses in hysteresis thresholding. The static map generator 310 classifies any edge with an intensity that is equal to or above the threshold $High(\theta_2)$ as a real edge. The static map generator 310 classifies any edge with an intensity that is equal to or below the threshold $Low(\theta_1)$ as not a real edge. The static map generator 310 classifies any edge with an intensity that is between the thresholds $Low(\theta_1)$ and $High(\theta_2)$ as a real edge only if the edge is itself connected to a real edge; otherwise, the edge is deleted. The thresholds $High(\theta_2)$ and $Low(\theta_1)$ improve the quality of a probabilistic static map 315 (FIG. 3).

The static map generator 310 next applies temporal averaging and temporal filtering to the noise-free binary image to boost the presence of static small objects and reduce any noise (if present), respectively. Temporal averaging enables the static map generator 310 to keep track of disappearing (i.e., outgoing) and appearing (i.e., incoming) small objects. In one embodiment, an average binary image resulting from temporal averaging and temporal filtering is represented in accordance with equation (5) provided below:

average binary image=α×average binary image+(1−
α)×binary image        (5).

The static map generator 310 next applies probabilistic thresholding to the average binary image to generate a probabilistic static map 315 that is more robust, noise-free, and contains only static small objects. Let av(i,j) generally denote a pixel of the average binary image, and let Static(i,j) generally denote a pixel of the probabilistic static map 315. For each pixel av(i,j) of the average binary image, if a probability the pixel av(i,j) has a non-zero pixel intensity is greater than n, the pixel av(i,j) is included in the probabilistic static map 315 (i.e., Static(i,j)=av(i,j)); otherwise, the pixel is set to zero in the probabilistic static map 315 (i.e., Static(i,j)=0).

Figure 5:
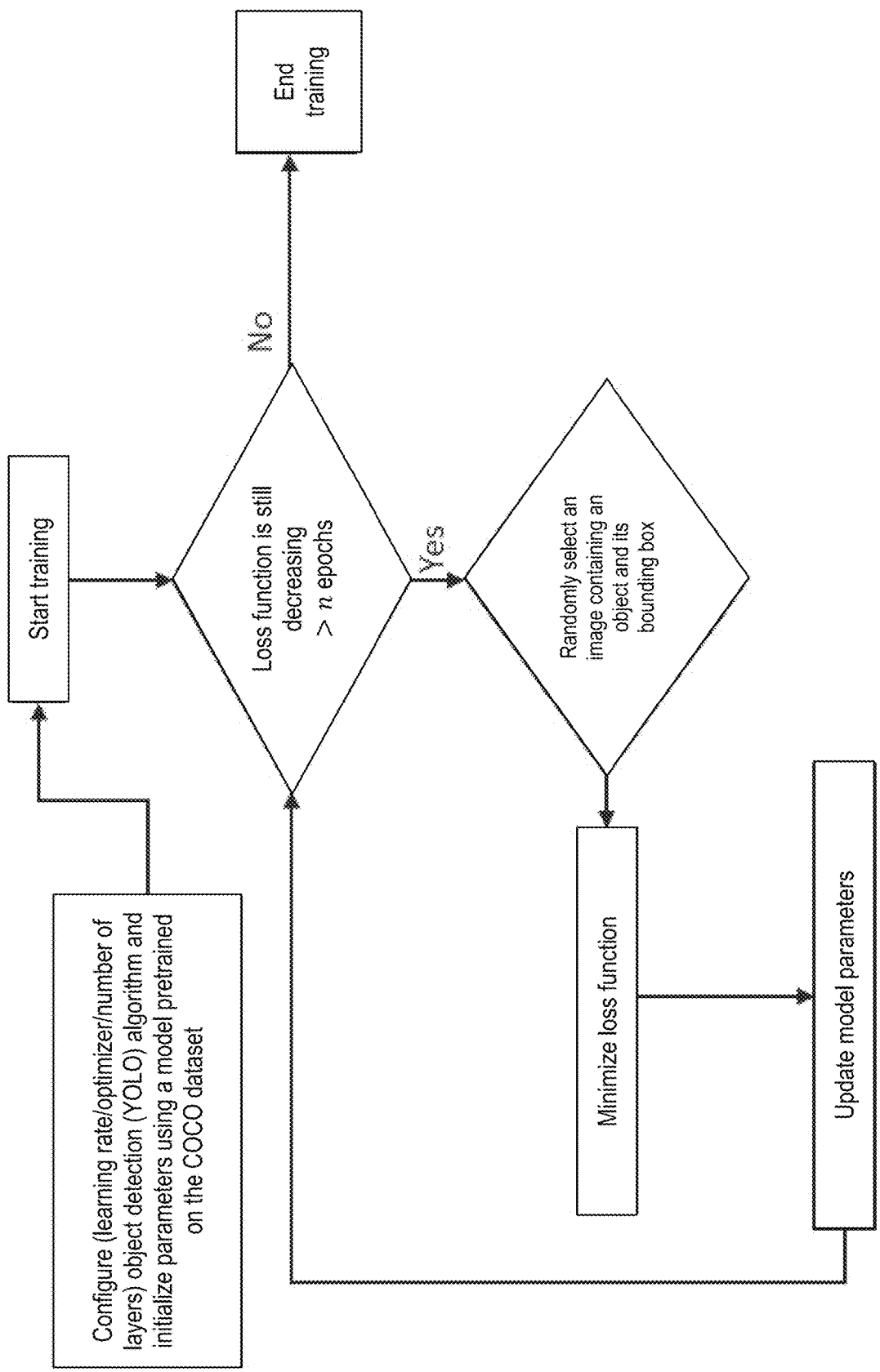
FIG. 5 illustrates an example workflow of training a deep learning model utilized by a deep learning You Only Look Once (YOLO)-based object detector of the training system, in one or more embodiments.

FIG. 5 illustrates an example workflow of training a deep learning model utilized by the deep learning YOLO-based object detector 320 (FIG. 3), in one or more embodiments. Before the start of training, the object detector 320 configures a YOLO-based object detection algorithm (e.g., learning rate, optimizer, number of layers), and initializes model parameters using a deep leaning model pre-trained on a large-scale object detection, segmentation, and captioning dataset, such as the Common Objects in Context (COCO) dataset. The deep learning model is trained for several epochs until a loss function converges to an optimal value. At each iteration of the training, it is determined if the loss function is still decreasing after n epochs. If the loss function is still decreasing, an image containing an object and its bounding box is randomly selected from the dataset, the loss function is minimized using the randomly selected image, and the model parameters are updated. If the loss function is not still decreasing (i.e., the loss function has converged to an optimal value), the training ends. The resulting trained deep learning model is then deployed as the YOLO-based object detection algorithm used by the object detector 320 to detect and localize small objects in an input frame 305 (FIG. 3).

Figure 6:
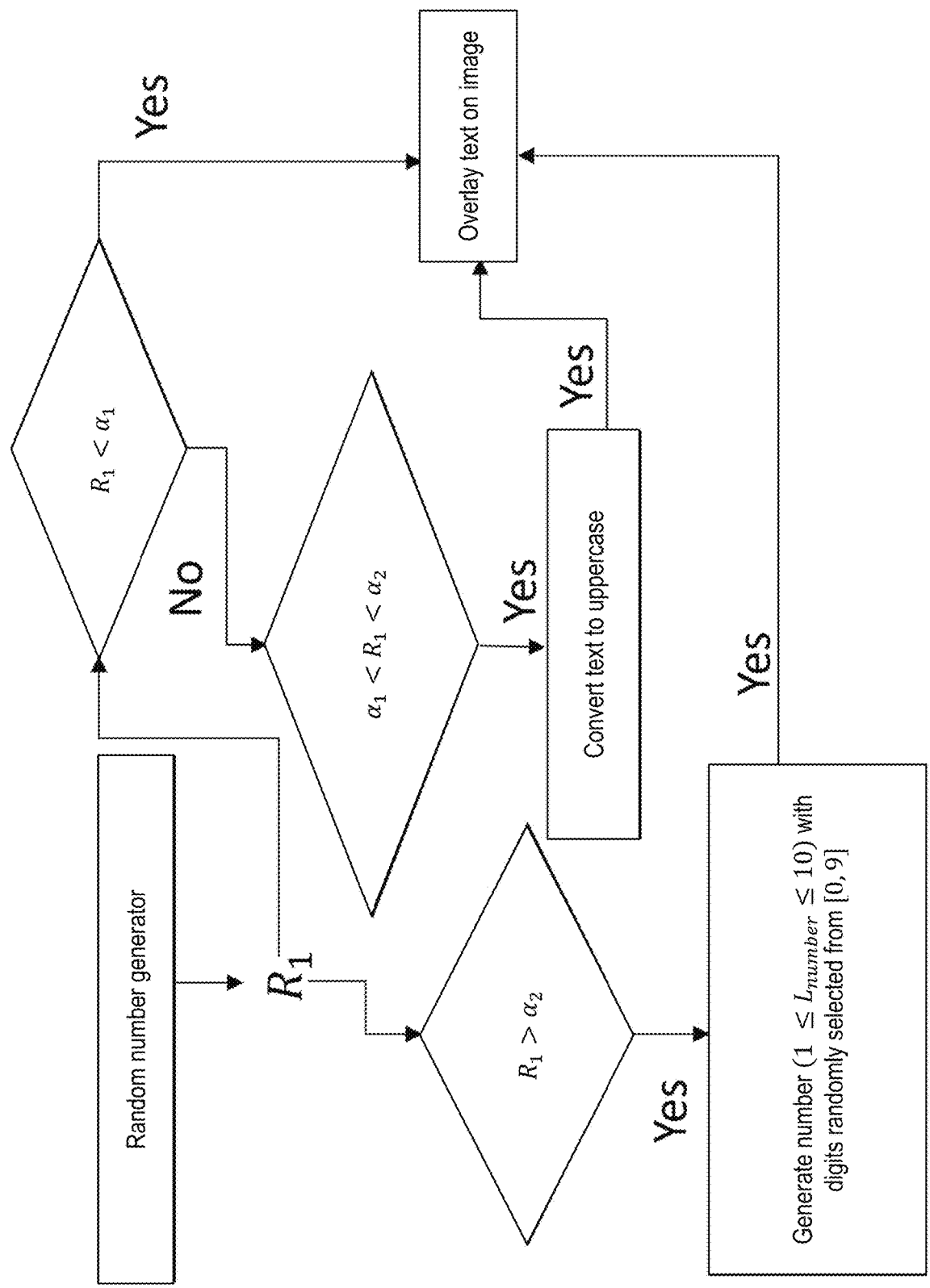
FIG. 6 illustrates an example workflow of a text overlayer of the training system, in one or more embodiments.

FIG. 6 illustrates an example workflow of the text overlayer 350 (FIG. 3), in one or more embodiments. For each cropped image 335 (FIG. 3) or 345 (FIG. 3) the text overlayer 350 receives, the text overlayer 350 uses a random number generator to randomly select text $R_1$ from the text database 360 (FIG. 3). If a length of the text $R_1$ is less than a first threshold $\alpha_1$, the text overlayer 350 overlays the text $R_1$ on the cropped image 335 or 345. If the length of the text $R_1$ is greater than a second threshold $\alpha_2$, the text overlayer 350 generates a number $L_{number}$ with digits randomly selected from [0, 9] (i.e., $1 \leq L_{number} \leq 10$), and overlays the number $L_{number}$ on the cropped image 335 or 345. If the length of the text $R_1$ is greater than the first threshold $\alpha_1$ but less than the second threshold $\alpha_2$, the text overlayer 350 converts the text $R_1$ to uppercase and overlays the resulting uppercase text $R_1$ on the cropped image 335 or 345.

Figure 7:
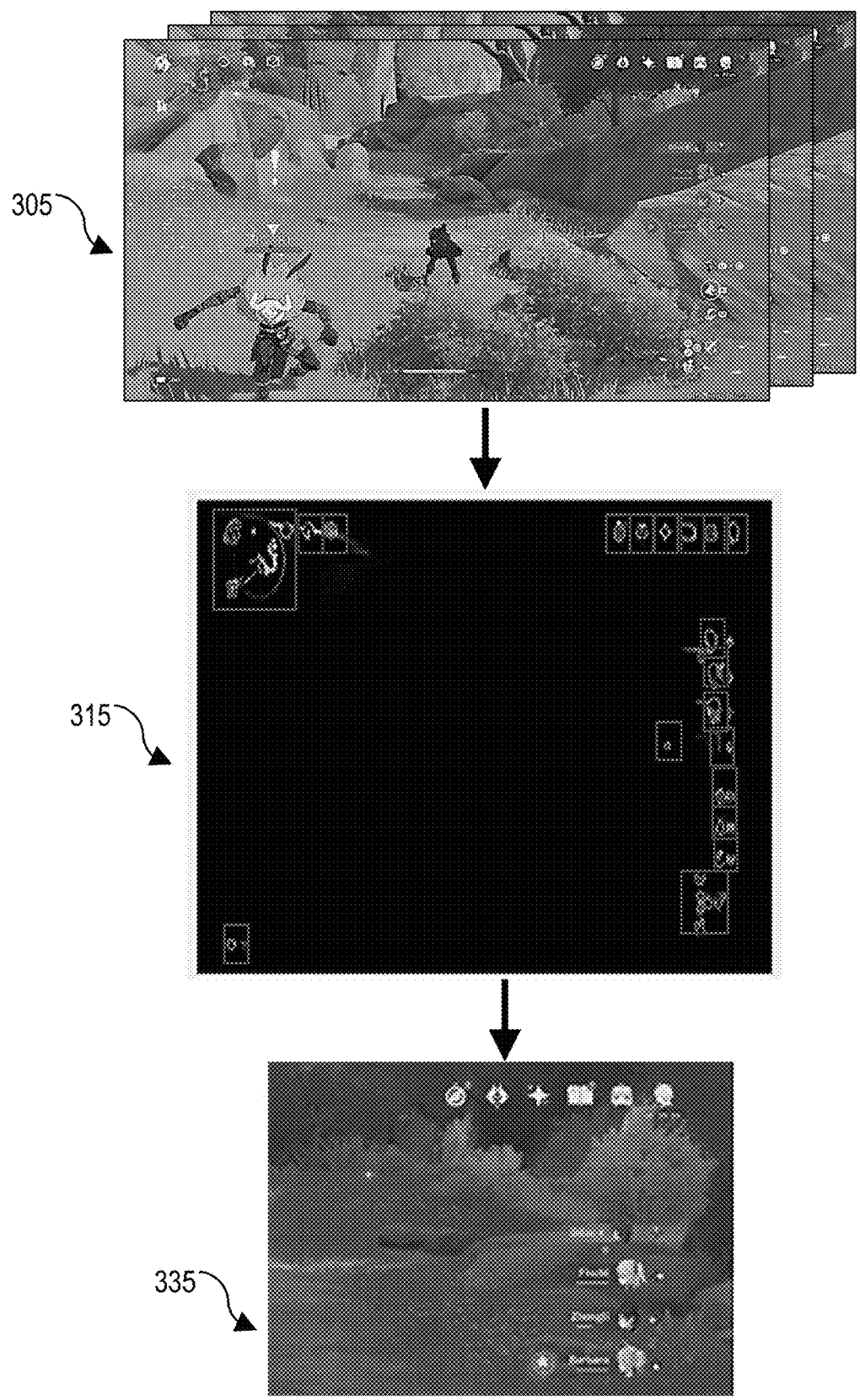
FIG. 7 illustrates example input frames, an example probabilistic static map, and an example static detection-based cropped image, in one or more embodiments.

FIG. 7 illustrates example input frames 305, an example probabilistic static map 315, and an example static detection-based cropped image 335, in one or more embodiments. In one embodiment, the static map generator 310 receives the input frames 305, and generates the probabilistic static map 315 by applying static detection to the input frames 305. The static detection-based cropped image generator 330 receives the probabilistic static map 315, and generates the static detection-based cropped image 335 based on the probabilistic static map 315 (i.e., high probability pixel-locations of detected static small objects).

Figure 8:
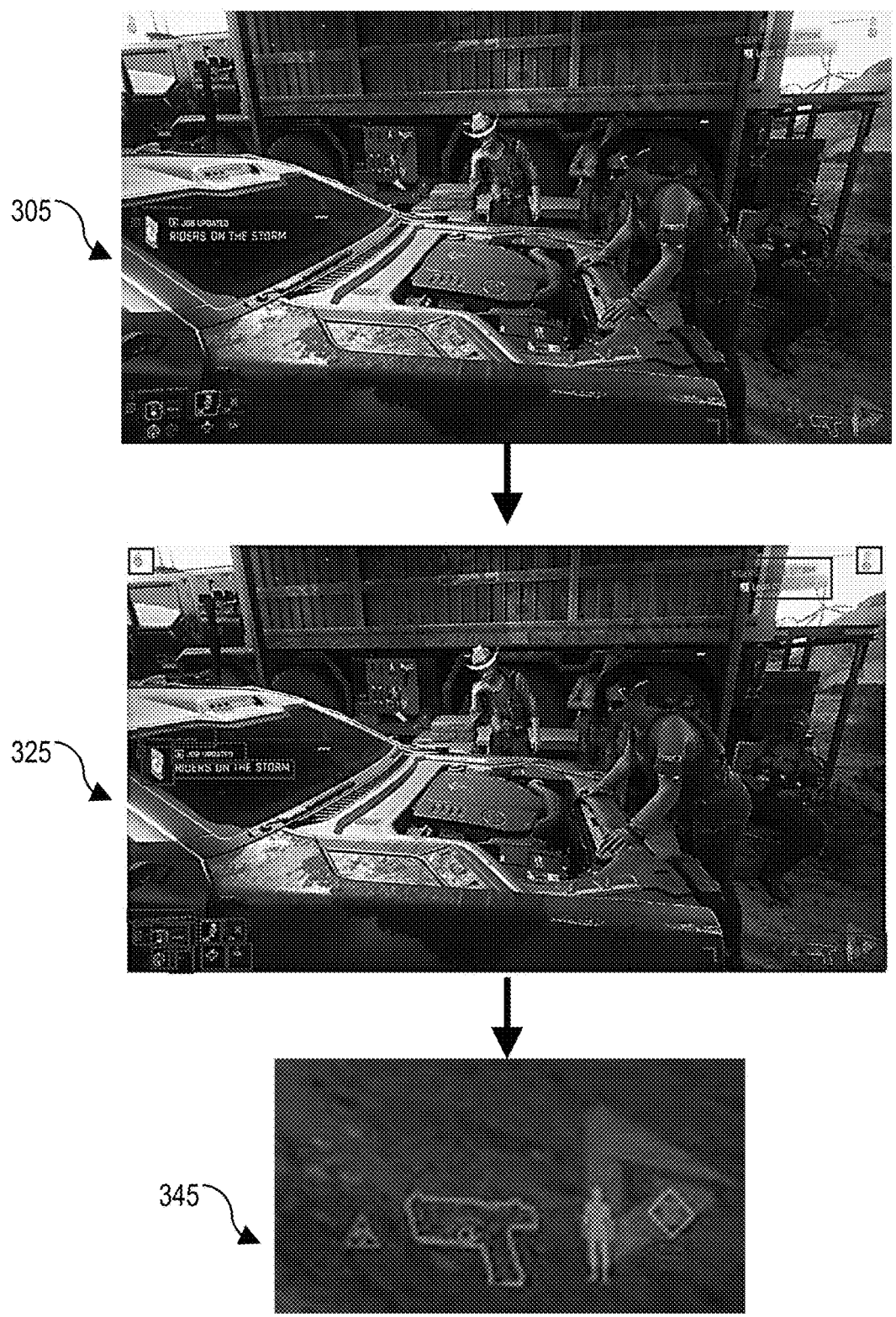
FIG. 8 illustrates an example input frame, an example output frame with one or more bounding boxes, and an example YOLO-based cropped image, in one or more embodiments.

FIG. 8 illustrates an example input frame 305, an example output frame 325 with one or more bounding boxes, and an example YOLO-based cropped image 345, in one or more embodiments. In one embodiment, the deep learning YOLO-based object detector 320 receives the input frame 305, and generates the output frame 325 by applying a YOLO-based object detection algorithm. The YOLO-based cropped image generator 340 receives the output frame 325, and generates the YOLO-based cropped image 345 based on the output frame 325 (i.e., bounding boxes of detected small objects).

Figure 9:
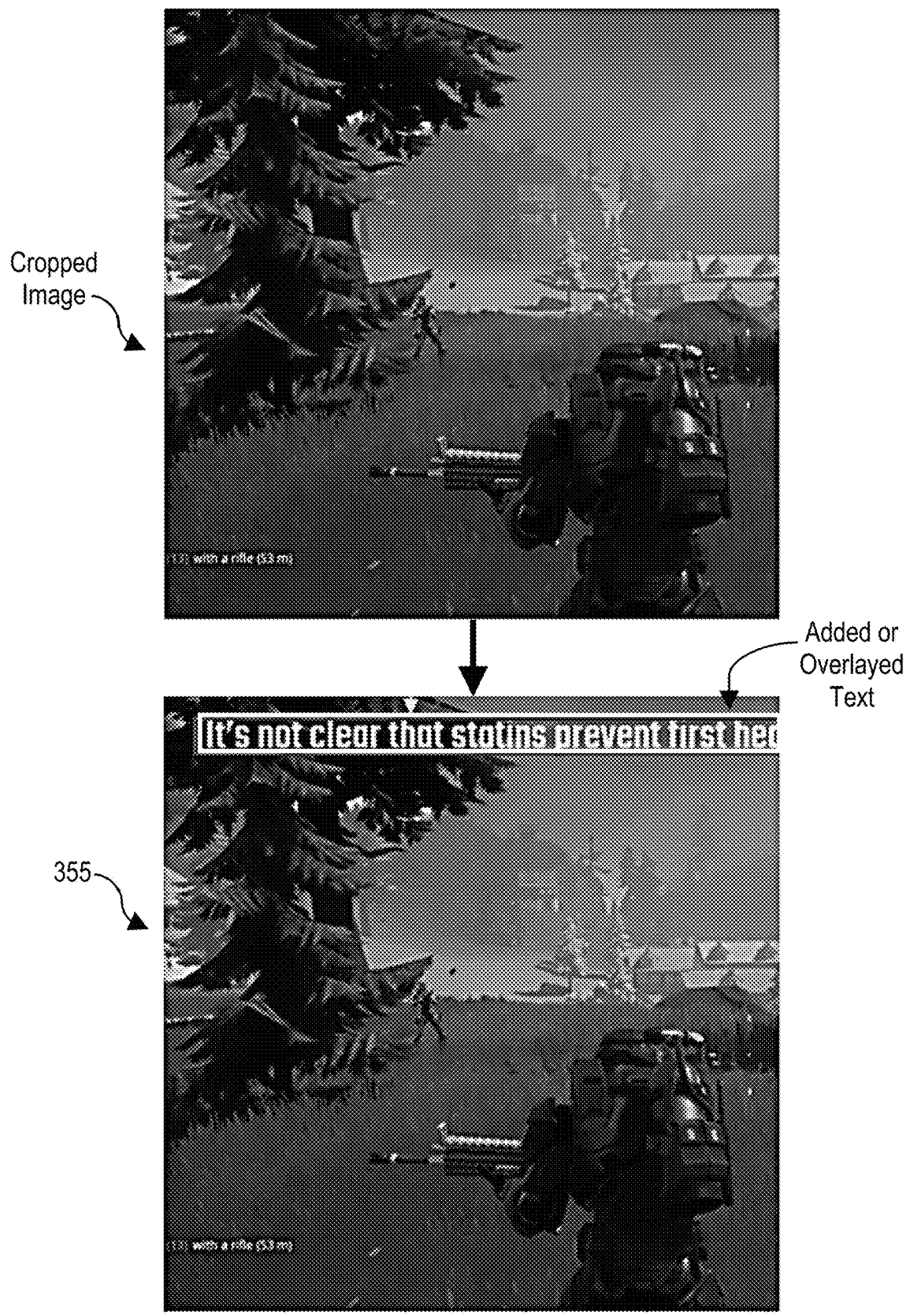
FIG. 9 illustrates an example cropped image and an example training image with added or overlayed text, in one or more embodiments.

FIG. 9 illustrates an example cropped image and an example training image 355 with added or overlayed text, in one or more embodiments. In one embodiment, the text overlayer 350 receives the cropped image (e.g., cropped image 335 or 345 in FIG. 3), and generates the training image 355 by adding or overlaying text on the cropped image.

FIG. 10 illustrates an example of visual differences between a LR image 401 and a HR image 402 reconstructed from the LR image 401 using a pruned SR network trained using training images 355 (FIG. 3) with added or overlayed text, in one or more embodiments. In one embodiment, the pruned SR network receives the LR image 401, rescales the LR image 401 to a size of the HR image 402, and reconstructs the HR image 402. Compared to the LR image 401, the HR image 402 has a higher image quality, as shown in FIG. 10. For example, the HR image 402 appears brighter, has less blurring and/or other visual artifacts, and may have a higher degree of color clarity and contrast.

FIG. 11A illustrates an example of visual differences between a HR image 410 reconstructed by a conventional pruned SR network and a HR image 411 reconstructed by a pruned SR network trained using training images 355 (FIG. 3) with added or overlayed text, in one or more embodiments. Compared to the HR image 410, the HR image 411 has a higher image quality, as shown in FIG. 11A. For example, the HR image 411 appears brighter, has less blurring and/or other visual artifacts, and may have a higher degree of color clarity and contrast.

FIG. 11B illustrates a first set of close-up views of the HR images 410 and 411 in FIG. 11A, in one or more embodiments. Some small objects displayed within the HR image 410—such as an icon and a logo—appear blurry and/or have other visual artifacts, as shown in FIG. 11B. By comparison, the same small objects displayed within the HR image 411 appear brighter, have less blurring and/or other visual artifacts, and may have a higher degree of color clarity and contrast, as shown in FIG. 11B.

Figure 11C:
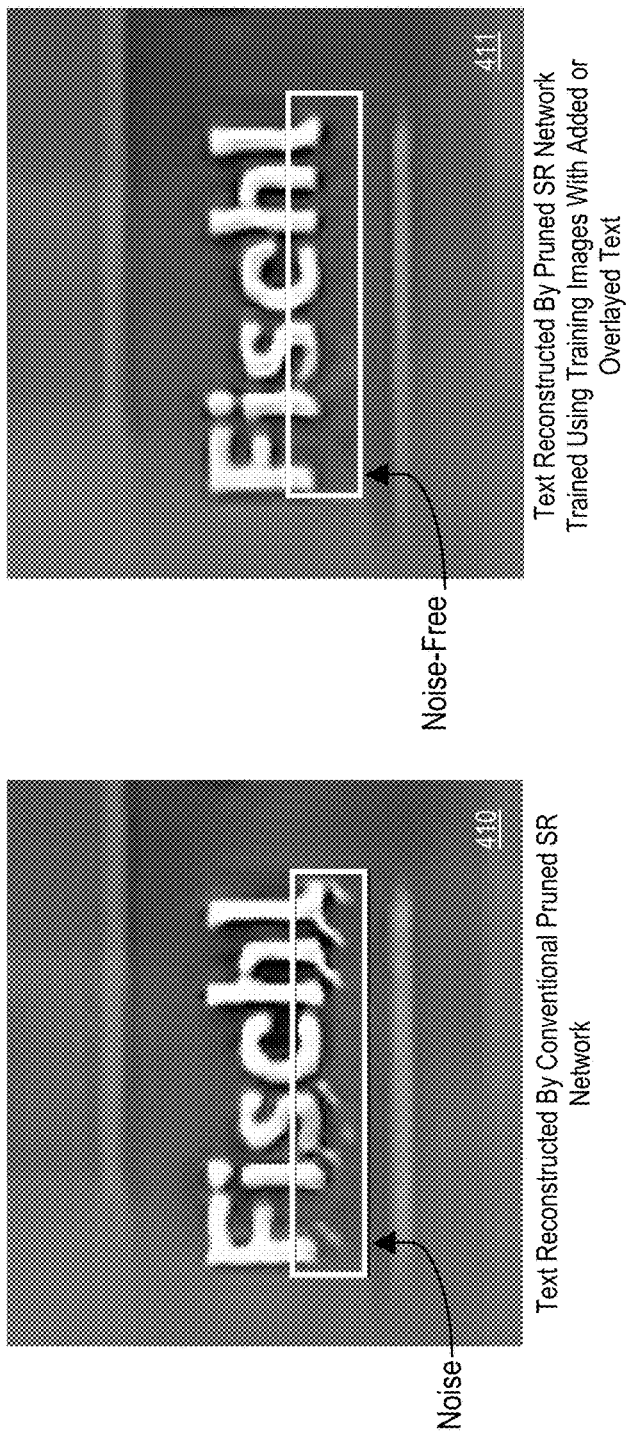
FIG. 11C illustrates a second set of close-up views of the HR images in FIG. 11A, in one or more embodiments.

FIG. 11C illustrates a second set of close-up views of the HR images 410 and 411 in FIG. 11A, in one or more embodiments. Text displayed within the HR image 410 have noise, as shown in FIG. 11C. By comparison, the same text displayed within the HR image 411 is noise-free, as shown in FIG. 11C.

FIG. 11D illustrates a third set of close-up views of the HR images 410 and 411 in FIG. 11A, in one or more embodiments. Some small objects displayed within the HR image 410—such as an icon, a logo, and text—are noisy and appear blurry and/or have other visual artifacts, as shown in FIG. 11D. By comparison, the same small objects displayed within the HR image 411 are noise-free and appear brighter, have less blurring and/or other visual artifacts, and may have a higher degree of color clarity and contrast, as shown in FIG. 11D.

Figure 12:
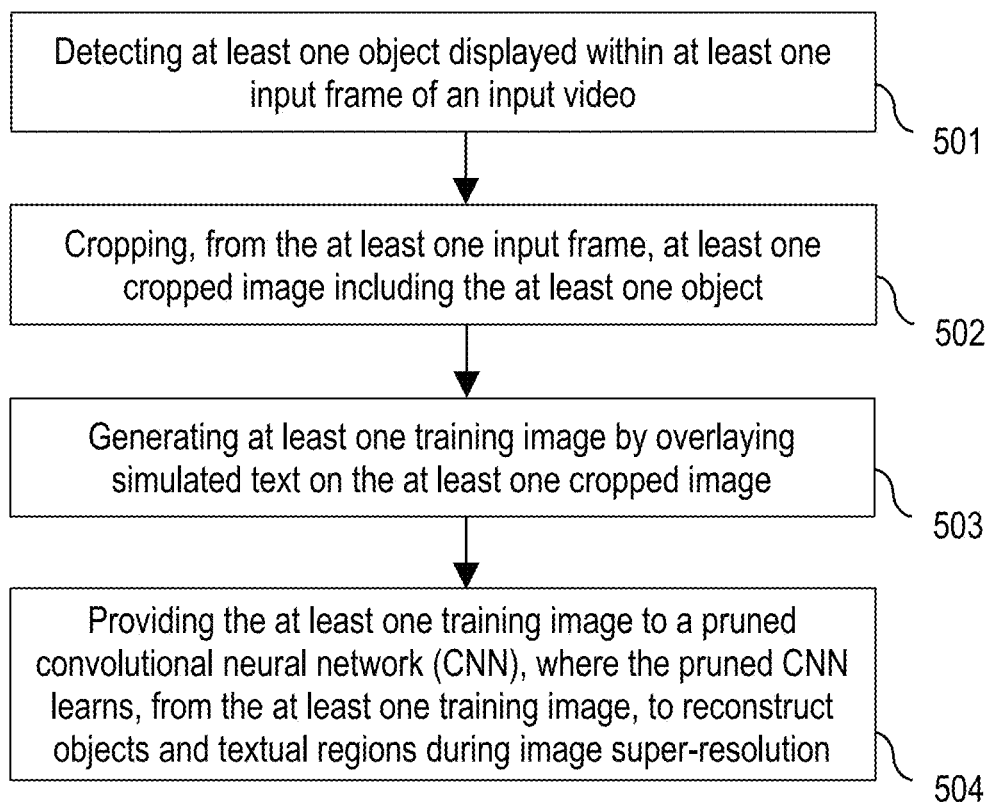
FIG. 12 is a flowchart of an example process for generating training data for training a pruned SR network to learn features corresponding to small objects, in one or more embodiments.

FIG. 12 is a flowchart of an example process 500 for generating training data for training a pruned SR network to learn features corresponding to small objects, in one or more embodiments. Process block 501 includes detecting (e.g., via static map generator 310 in FIG. 3 or deep learning YOLO-based object detector 320 in FIG. 3) at least one object (e.g., small object 11 in FIG. 1) displayed within at least one input frame (e.g., input frame 305 in FIG. 3) of an input video. Process block 502 includes cropping (e.g., via static detection-based cropped image generator 330 in FIG. 3 or YOLO-based cropped image generator 340 in FIG. 3), from the at least one input frame, at least one cropped image (e.g., cropped image 335 or 345 in FIG. 3) including the at least one object. Process block 503 includes generating (e.g., via text overlayer 350 in FIG. 3) at least one training image (e.g., training image 355 in FIG. 3) by overlaying simulated text on the at least one cropped image. Process block 504 includes providing the at least one training image to a pruned convolutional neural network (CNN) (e.g., pruned SR network 370 in FIG. 3), wherein the pruned CNN learns, from the at least one training image, to reconstruct objects and textual regions during image super-resolution.

In one embodiment, process blocks 501-504 may be performed by one or more components of the training system 300.

Figure 13:
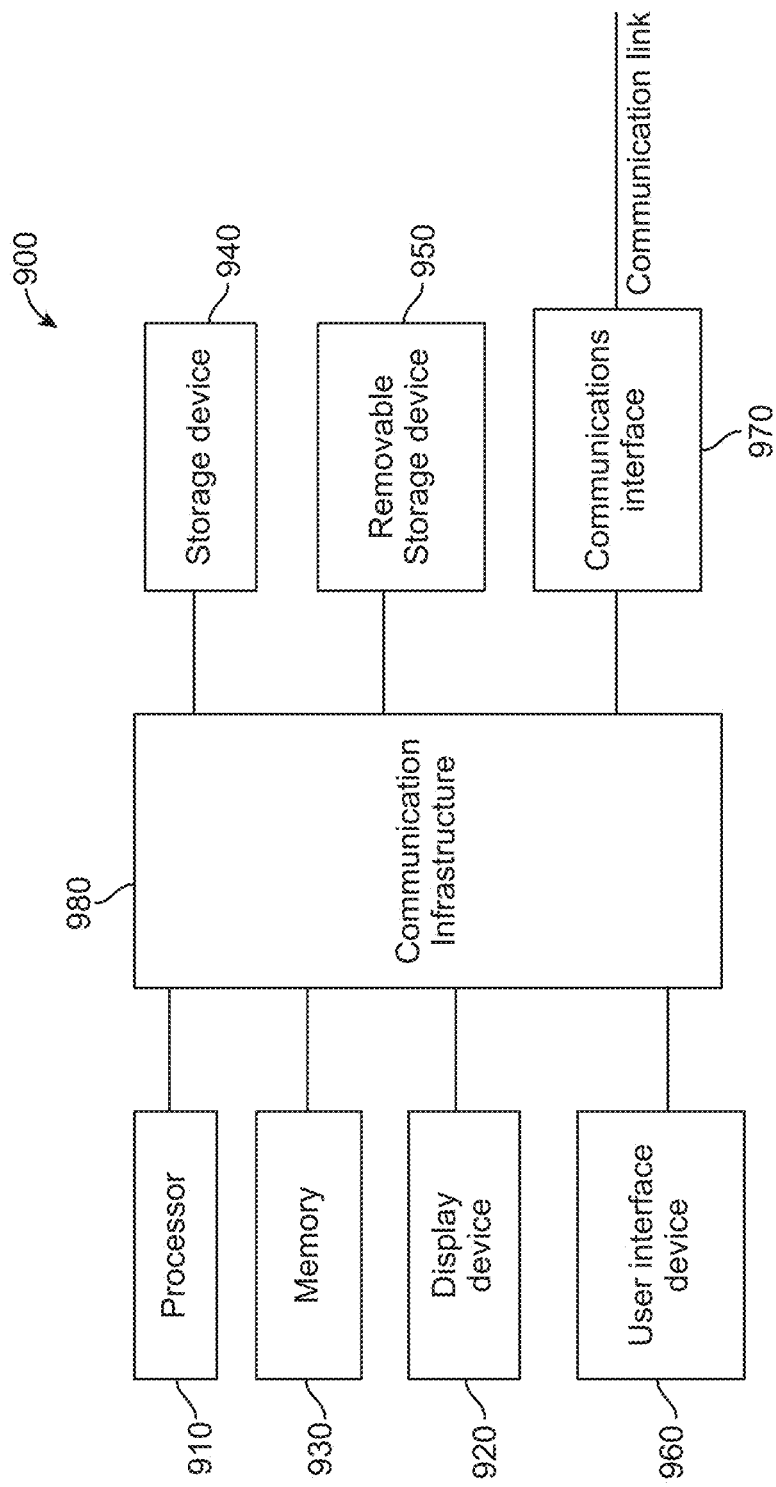
FIG. 13 is a high-level block diagram showing an information processing system comprising a computer system useful for implementing the disclosed embodiments.

FIG. 13 is a high-level block diagram showing an information processing system comprising a computer system 900 useful for implementing the disclosed embodiments. The system 300 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 500 (FIG. 12) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    detecting at least one object displayed within at least one input frame of an input video;
    cropping, from the at least one input frame, at least one cropped image including the at least one object;
    generating at least one training image by overlaying simulated text on the at least one cropped image; and
    providing the at least one training image to a pruned convolutional neural network (CNN), wherein the pruned CNN learns, from the at least one training image, to reconstruct objects and textual regions during image super-resolution.

2. The method of claim 1, wherein the detecting comprises:
    applying Sobel edge detection to a pre-determined number of input frames of the input video to generate a probabilistic static map, wherein the probabilistic static map is noise-free and contains only one or more static objects detected within the pre-determined number of input frames.

3. The method of claim 2, wherein the cropping comprises:
    determining a center of each of the one or more static objects detected based on the probabilistic static map;
    generating a list comprising each pixel-location of each center determined;
    randomly sampling a pixel-location from the list; and
    generating a cropped image comprising at least one of the one or more static objects detected, wherein the randomly sampled pixel-location is a center of the cropped image.

4. The method of claim 1, wherein the detecting comprises:
    training a deep learning model for You Only Look Once (YOLO)-based object detection;
    detecting and localizing one or more objects within the at least one input frame of the input video using the deep learning model; and
    providing an output frame comprising the one or more objects and one or more bounding boxes corresponding to the one or more objects.

5. The method of claim 4, wherein the cropping comprises:
    generating a list comprising each of the one or more bounding boxes;
    randomly selecting a bounding box from the list; and
    generating a cropped image comprising at least one of the one or more objects, wherein the randomly selected bounding box corresponds to an object included in the cropped image.

6. The method of claim 1, wherein each object occupies less than five percent of an entire area of the at least one input frame.

7. The method of claim 6, wherein each object is one of an icon, a map, a logo, a number, or text.

8. The method of claim 1, wherein the simulated text comprises at least one of a character, a word, a sentence, a paragraph, a name, or a number.

9. A system comprising:
    at least one processor; and
    a non-transitory processor-readable memory device storing instructions that when executed by the at least one processor causes the at least one processor to perform operations including:
        detecting at least one object displayed within at least one input frame of an input video;
        cropping, from the at least one input frame, at least one cropped image including the at least one object;
        generating at least one training image by overlaying simulated text on the at least one cropped image; and
        providing the at least one training image to a pruned convolutional neural network (CNN), wherein the pruned CNN learns, from the at least one training image, to reconstruct objects and textual regions during image super-resolution.

10. The system of claim 9, wherein the detecting comprises:
    applying Sobel edge detection to a pre-determined number of input frames of the input video to generate a probabilistic static map, wherein the probabilistic static map is noise-free and contains only one or more static objects detected within the pre-determined number of input frames.

11. The system of claim 10, wherein the cropping comprises:
    determining a center of each of the one or more static objects detected based on the probabilistic static map;
    generating a list comprising each pixel-location of each center determined;
    randomly sampling a pixel-location from the list; and
    generating a cropped image comprising at least one of the one or more static objects detected, wherein the randomly sampled pixel-location is a center of the cropped image.

12. The system of claim 9, wherein the detecting comprises:
    training a deep learning model for You Only Look Once (YOLO)-based object detection;
    detecting and localizing one or more objects within the at least one input frame of the input video using the deep learning model; and providing an output frame comprising the one or more objects and one or more bounding boxes corresponding to the one or more objects.

13. The system of claim 12, wherein the cropping comprises:
generating a list comprising each of the one or more bounding boxes;
randomly selecting a bounding box from the list; and
generating a cropped image comprising at least one of the one or more objects, wherein the randomly selected bounding box corresponds to an object included in the cropped image.

14. The system of claim 9, wherein each object occupies less than five percent of an entire area of the at least one input frame.

15. The system of claim 14, wherein each object is one of an icon, a map, a logo, a number, or text.

16. The system of claim 9, wherein the simulated text comprises at least one of a character, a word, a sentence, a paragraph, a name, or a number.

17. A non-transitory processor-readable medium that includes a program that when executed by a processor performs a method comprising:
detecting at least one object displayed within at least one input frame of an input video;
cropping, from the at least one input frame, at least one cropped image including the at least one object;
generating at least one training image by overlaying simulated text on the at least one cropped image; and
providing the at least one training image to a pruned convolutional neural network (CNN), wherein the pruned CNN learns, from the at least one training image, to reconstruct objects and textual regions during image super-resolution.

18. The non-transitory processor-readable medium of claim 17, wherein the detecting comprises:
applying Sobel edge detection to a pre-determined number of input frames of the input video to generate a probabilistic static map, wherein the probabilistic static map is noise-free and contains only one or more static objects detected within the pre-determined number of input frames.

19. The non-transitory processor-readable medium of claim 17, wherein the detecting comprises:
training a deep learning model for You Only Look Once (YOLO)-based object detection;
detecting and localizing one or more objects within the at least one input frame of the input video using the deep learning model; and
providing an output frame comprising the one or more objects and one or more bounding boxes corresponding to the one or more objects.

20. The non-transitory processor-readable medium of claim 17, wherein each object occupies less than five percent of an entire area of the at least one input frame.

* * * * *